United States Patent [19]

Boyd et al.

[11] 4,254,027
[45] Mar. 3, 1981

[54] DISPERSE MONOAZO DYESTUFFS FOR COLORING SYNTHETIC TEXTILE MATERIALS

[75] Inventors: Violet Boyd; Brian R. Fishwick, both of Manchester, England; Brian Glover, Charlotte, N.C.

[73] Assignee: Imperial Chemical Industries Limited, London, England

[21] Appl. No.: 698,584

[22] Filed: Jun. 21, 1976

[30] Foreign Application Priority Data

Jul. 28, 1975 [GB] United Kingdom ............. 31543/75

[51] Int. Cl.³ .................. C07C 107/06; C09B 29/085; C09B 29/26
[52] U.S. Cl. .................................. 260/207; 8/137; 8/693; 260/207.1
[58] Field of Search ............................ 260/207, 207.1

[56] References Cited

U.S. PATENT DOCUMENTS

| | | | |
|---|---|---|---|
| 2,373,700 | 4/1945 | McNally et al. | 260/207 X |
| 3,398,136 | 8/1968 | Groebke et al. | 260/207 |
| 3,520,871 | 7/1970 | Zanella | 260/207 |
| 3,637,651 | 1/1972 | Baron et al. | 260/207 |
| 3,801,270 | 4/1974 | Renfrew et al. | 260/207 X |

FOREIGN PATENT DOCUMENTS 1380845  1/1975  United Kingdom ................. 260/207.1

Primary Examiner—Charles F. Warren
Attorney, Agent, or Firm—Cushman, Darby & Cushman

[57] ABSTRACT

The disperse monoazo dyestuffs of the formula:

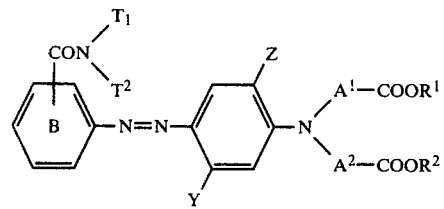

wherein $T^1$ and $T^2$ are each independently hydrogen or lower alkyl, Z is hydrogen, lower alkyl, or lower alkoxy, Y is hydrogen, lower alkyl, lower alkoxy, chlorine, bromine, $-NHCOX^1$ or $-NHSO_2X^2$, $X^1$ is lower alkyl, lower alkoxy, amino or N-lower alkylamino, $X^2$ is lower alkyl, $A^1$ and $A^2$ are each independently lower alkylene, $R^1$ and $R^2$ are each independently lower alkyl or hydroxyalkyl containing from 2 to 4 carbon atoms, and the benzene ring B can contain additional susbstituents apart from sulphonic acid groups, a process for the manufacture of the said dyestuffs, and their use for coloring synthetic textile materials in yellow to blue shades.

2 Claims, No Drawings

DISPERSE MONOAZO DYESTUFFS FOR COLORING SYNTHETIC TEXTILE MATERIALS

This invention relates to disperse monoazo dyestuffs which are valuable for colouring synthetic textile materials, particularly aromatic polyester textile materials.

According to the invention there are provided the disperse monoazo dyestuffs of the formula:

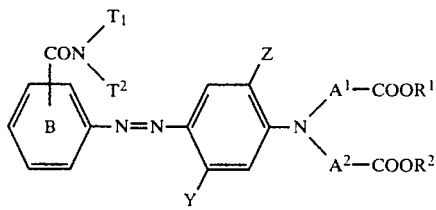

wherein $T^1$ and $T^2$ are each independently hydrogen or lower alkyl, Z is hydrogen, lower alkyl or lower alkoxy, Y is hydrogen, lower alkyl, lower alkoxy, chlorine bromine, —$NHCOX^1$ or —$NHSO_2X^2$, $X^1$ is lower alkyl, lower alkoxy, amino or N-lower alkylamino, $X^2$ is lower alkyl, $A^1$ and $A^2$ are each independently lower alkylene, $R^1$ and $R^2$ are each independently lower alkyl or hydroxylalkyl containing from 2 to 4 carbon atoms, and the benzene ring B can contain additional substituents apart from sulphonic acid groups.

Throughout this Specification the terms "lower alkyl" and "lower alkoxy" are used to denote alkyl and alkoxy radicals respectively containing from 1 to 4 carbon atoms, whilst "lower alkylene" denotes alkylene radicals containing from 1 to 6 carbon atoms.

As examples of lower alkyl represented by $T^1$, $T^2$, Z, Y, $X^1$, $X^2$, $R^1$ and $R^2$ there may be mentioned methyl, ethyl, n-propyl, isopropyl, isobutyl, sec-butyl and n-butyl. As examples of lower alkoxy represented by $X^1$, Z and Y there may be mentioned ethoxy and preferably methoxy. As examples of lower alkylene represented by $A^1$ and $A^2$ there may be mentioned methylene, trimethylene, propylene, tetramethylene, hexamethylene and, above all, ethylene. As examples of hydroxyalkyl represented by $R^1$ and $R^2$ there may be mentioned β-hydroxyethyl, β-or γ-hydroxypropyl and β-, γ- or δ-hydroxybutyl. As examples of N-lower alkylamino represented by $X^1$ there may be mentioned methylamino and ethylamino.

As examples of additional substituents which may be present on the benzene ring B there may be mentioned chlorine, bromine, nitro, lower alkyl such as methyl, and lower alkoxy such as methoxy.

A preferred class of the dyestuffs of the invention comprises the dyestuffs of the formula:

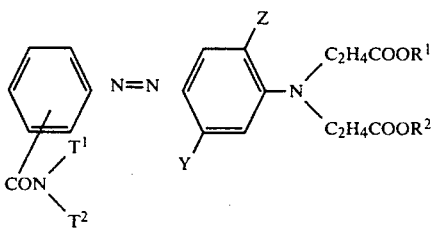

wherein $T^1$, $T^2$, Y, Z, $R^1$ and $R^2$ have the meanings stated. Preferably Y is hydrogen or lower alkylcarbonylamino. It is further preferred that $R^1$ and $R^2$ are both lower alkyl.

According to a further feature of the invention there is provided a process for the manufacture of the said dyestuffs which comprises diazotising an amine of the formula:

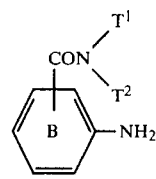

and coupling with a coupling component of the formula:

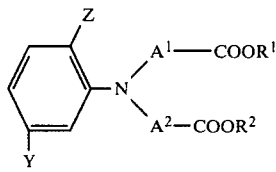

wherein $T^1$, $T^2$, Z, Y, $A^1$, $A^2$, $R^1$, $R^2$ and B have the meanings stated.

The process of the invention can be conveniently carried out by, for example, adding sodium nitrite to a solution or suspension of the amine in an aqueous solution of a strong inorganic acid, or by adding the amine to a solution of nitrosulsulphuric acid. Sulphamic acid can then be added, if desired, to destroy any residual nitrous acid, and the resulting solution or suspension of the diazo compound is then added to a solution of the coupling component in water containing an acid and/or a water-soluble organic liquid such as acetone. The pH of the resulting mixture is then, if desired, adjusted so as to facilitate coupling, and when this is complete the resulting dyestuff is isolated in conventional manner.

As examples of the said amines there may be mentioned 2-, 3- or 4-carbamoylaniline, 2-, 3- or 4-[N-(methyl, ethyl, n-propyl or n-butyl) carbamoyl]aniline, 2-, 3- or 4-[N:N-di(methyl, ethyl, n-propyl or n-butyl) carbamoyl]aniline, 2- carbamoyl -4- or 5-chloroaniline, 2-carbamoyl-4- or 5-bromoaniline, 2-carbamoyl-4- or 5-nitroaniline and 2-carbamoyl-4:6-dinitro aniline.

As examples of the said coupling components there may be mentioned N:N-di(β-methoxycarbonylethyl)-aniline, -m-toluidine, -m-chloroaniline, -m-acetylaminoaniline or -2:5-dimethoxyaniline, and N:N-di[β-(β'-hydroxyethoxycarbonyl)ethyl]-aniline, -m-toluidine, -m-chloroaniline, -m-acetylaminoaniline, -o-toluidine, -2-methoxy-5 acetylaminoaniline or -2:5-dimethoxyaniline.

The azo dyestuffs of the invention when dispersed in aqueous medium are valuable for colouring synthetic textile materials for example cellulose acetate, nylon and especially aromatic polyester textile materials. The said colorations can be obtained by dyeing, padding or printing processes using the conditions and other additives which are conventional in colouring such textile materials. At the conclusion of the said processes the coloured textile materials are rinsed in water and then preferably given a clearing treatment in order to remove loose dyestuff from the surface of the textile material. Whilst this clearing treatment can comprise immersion in a warm aqueous alkaline solution of sodium hydrosulphite it is found that the presence of the sodium hydrosulphite is not essential and treatment for a few minutes in an aqueous alkaline solution of pH between 10 and 13.5 and at a temperature of between 50° and 85° C. (for example in an aqueous solution of sodium carbonate or sodium hydroxide) completely removes loose dyestuff.

When so applied the azo dyestuffs of the invention yield yellow to blue shades having excellent fastness to the tests conventionally applied to synthetic textile materials.

The azo dyestuffs of the invention can also be used for the mass coloration of aromatic polyesters, or can be used to colour synthetic textile materials by the transfer printing process optionally under vacuum or under wet or humid conditions.

The invention is illustrated but not limited by the following Examples in which the parts and percentages are by weight.

EXAMPLE 1

18.4 parts of sulphuric acid are added to a solution of 2.54 parts of 2-(N:N-dimethylcarbamoyl)-4:6-dinitroaniline in 50 parts of acetic acid at a temperature below 25° C. The mixture is cooled to 5° C. and 7 parts of a 14% aqueous solution of sodium nitrite added at a temperature below 10° C. The mixture is stirred for 15 minutes at the same temperature and is then added to a mixture of 3.25 parts of 2-methoxy-5-acetylamino-N:N-di(methoxycarbonylethyl)aniline, 0.5 parts of sulphamic acid, 20 parts of acetone and 200 parts of ice/water. The pH of the mixture is adjusted to 5 by the addition of sodium acetate, the mixture is stirred for 1 hour, and the precipitated dyestuff is then filtered off, washed with water and dried.

The dyestuff is converted into an aqueous dispersion and this is incorporated into a print paste which is then applied onto a polyethylene terephthalate textile material in conventional manner, after which any unfixed dyestuff is removed by treatment in an aqueous solution of sodium carbonate at 80° C. A bright reddish blue print is obtained which has excellent fastness to light, to wet treatments and to dry heat treatments.

Further dyestuffs of the invention are obtained by diazotising 2-(N:N-dimethylcarbamoyl)-4-nitroaniline and coupling with the coupling components listed in the second column of Table I using methods similar to that described in Example 1. The shades obtained from the resulting dyestuffs are given in the third column of the Table.

TABLE I

| | Coupling Component | Shade |
|---|---|---|
| 1 | 2-methoxy-5-methyl-N:N-di($\beta$-methoxycarbonylethyl)aniline | Bluish-red |
| 2 | 2-methoxy-5-acetylamino-N:N-di($\beta$-ethoxycarbonylethyl)aniline | Reddish-violet |
| 3 | 3-methyl-N:N-di($\beta$-methoxycarbonylethyl)aniline | Red |
| 4 | N:N-di($\beta$-methoxycarbonylethyl)aniline | Scarlet |
| 5 | 2:5-dimethoxy-N:N-di($\beta$-ethoxycarbonylethyl)aniline | Violet |
| 6 | 2:5-dimethoxy-N:N-di($\beta$-methoxycarbonylethyl)aniline | " |
| 7 | 2:5-dimethoxy-N:N-di($\delta$-methoxycarbonylbutyl)aniline | " |
| 8 | 2:5-dimethoxy-N:N-di($\beta$-methoxycarbonylpropyl)aniline | " |
| 9 | 2-methoxy-5-methyl-N:N-di($\delta$-methoxycarbonylbutyl)aniline | Rubine |
| 10 | 2-methoxy-5-methyl-N:N-di[$\beta$-($\gamma$'-hydroxypropoxycarbonyl)ethyl]aniline | " |
| 11 | 3-methyl-N:N-di($\beta$-ethoxycarbonylethyl)aniline | Red |
| 12 | 3-methyl-N:N-di($\beta$-n-propoxycarbonylethyl)aniline | " |
| 13 | 3-methyl-N:N-di($\beta$-isopropoxycarbonylethyl)aniline | " |
| 14 | 3-methyl-N:N-di($\beta$-n-butoxycarbonylethyl)aniline | " |
| 15 | 3-methyl-N:N-di[$\beta$-($\beta$'-methyl-n-propoxycarbonyl)ethyl]aniline | " |
| 16 | 3-methyl-N:N-di[$\beta$-($\alpha$'-methyl-n-propoxycarbonyl)ethyl]aniline | " |
| 17 | 3-methyl-N:N-di($\gamma$-methoxycarbonylpropyl)aniline | " |
| 18 | 3-methyl-N:N-di(methoxycarbonylmethyl)aniline | Reddish-orange |
| 19 | 3-methyl-N:N-di(ethoxycarbonylmethyl)aniline | " |
| 20 | 3-methyl-N:N-di($\delta$-methoxycarbonylbutyl)aniline | Red |
| 21 | 3-methyl-N:N-di($\beta$-methoxycarbonylpropyl)aniline | " |
| 22 | 2-ethoxy-N:N-di($\beta$-methoxycarbonylethyl)aniline | Bluish-red |
| 23 | 2-ethoxy-N:N-di(methoxycarbonylmethyl)aniline | Red |
| 24 | 2-ethoxy-N:N-di(ethoxycarbonylmethyl)aniline | " |
| 25 | 2-ethoxy-N:N-di($\beta$-methoxycarbonylpropyl)aniline | Bluish-red |
| 26 | 2-methoxy-5-chloro-N:N-di($\beta$-methoxycarbonylethyl)aniline | Red |
| 27 | 2-methoxy-5-bromo-N:N-di($\beta$-methoxycarbonylethyl)aniline | " |
| 28 | 2:5-diethoxy-N:N-di($\beta$-methoxycarbonylethyl)aniline | Violet |
| 29 | 2-methoxy-5-methyl-N:N-di($\beta$-methoxycarbonylethyl)aniline | Reddish-violet |
| 30 | 2-methoxy-5-methyl-N:N-di($\beta$-ethoxycarbonylethyl)aniline | " |
| 31 | 2-methoxy-5-methyl-N:N-di(methoxycarbonylmethyl)aniline | Rubine |
| 32 | 2:5-dimethoxy-N:N-di(ethoxycarbonylmethyl)aniline | " |
| 33 | 2-methoxy-5-methyl-N:N-di(ethoxycarbonylmethyl)aniline | " |
| 34 | 2-ethoxy-5-methyl-N:N-di($\beta$-methoxycarbonylethyl)aniline | Reddish-violet |
| 35 | 2-ethoxy-5-methyl-N:N-di(methoxycarbonylmethyl)aniline | Rubine |
| 36 | 3-chloro-N:N-di($\beta$-methoxycarbonylethyl)aniline | Scarlet |
| 37 | 3-bromo-N:N-di($\beta$-methoxycarbonylethyl)aniline | " |
| 38 | 3-chloro-N:N-di($\beta$-ethoxycarbonylethyl)aniline | " |
| 39 | 3-chloro-N:N-di($\gamma$-methoxycarbonylpropyl)aniline | " |
| 40 | 3-chloro-N:N-di(methoxycarbonylmethyl)aniline | Orange |
| 41 | 3-chloro-N:N-di(methoxycarbonylmethyl)aniline | " |
| 42 | 3-chloro-N:N-di($\beta$-methoxycarbonylpropyl)aniline | Scarlet |
| 43 | 3-acetylamino-N:N-di($\beta$-methoxycarbonylethyl)aniline | Bluish-red |
| 44 | 3-acetylamino-N:N-di($\beta$-ethoxycarbonylethyl)aniline | " |
| 45 | 3-acetylamino-N:N-di($\gamma$-methoxycarbonylpropyl)aniline | Rubine |
| 46 | 3-acetylamino-N:N-di(ethoxycarbonylmethyl)aniline | Scarlet |
| 47 | 3-acetylamino-N:N-di($\beta$-methoxycarbonylpropyl)aniline | Bluish-red |
| 48 | 3-propionylamino-N:N-di($\beta$-methoxycarbonylethyl)aniline | " |
| 49 | 3-n-propylcarbonylamino-N:N-di($\beta$-methoxycarbonylethyl)aniline | " |

TABLE I-continued

| | Coupling Component | Shade |
|---|---|---|
| 50 | 3-isopropylcarbonylamino-N:N-di(β-methoxycarbonylethyl)aniline | " |
| 51 | 3-methoxycarbonylamino-N:N-di(β-methoxycarbonylethyl)aniline | " |
| 52 | 3-ethoxycarbonylamino-N:N-di(β-methoxycarbonylethyl)aniline | " |
| 53 | 3-ureido-N:N-di(β-methoxycarbonylethyl)aniline | " |
| 54 | 3-N-methylureido-N:N-di(βmethoxycarbonylethyl)aniline | " |
| 55 | 3-N-ethylureido-N:N-di(β-methoxycarbonylethyl)aniline | " |
| 56 | 3-methylsulphonylamino-N:N-di(β-methoxycarbonylethyl)aniline | " |
| 57 | 3-methylsulphonylamino-N:N-di(β-ethoxycarbonylethyl)aniline | " |
| 58 | 3-ethylsulphonylamino-N:N-di(β-methoxycarbonylethyl)aniline | " |
| 59 | 2-methoxy-5-propionylamino-N:N-di(β-methoxycarbonylethyl)aniline | Reddish-violet |
| 60 | 2-ethoxy-5-acetylamino-N:N-di(β-methoxycarbonylethyl)aniline | " |
| 61 | 3-methoxy-N:N-di(β-methoxycarbonylethyl)aniline | Bluish-red |
| 62 | 3-methyl-N:N-di[β-(β'-hydroxyethoxycarbonyl)ethyl]aniline | Red |
| 63 | 2-methoxy-N:N-di[β-(β'-hydroxyethoxycarbonyl)ethyl]aniline | Bluish-red |
| 64 | 2:5-dimethoxy-N:N-di[β-(β'-hydroxyethoxycarbonnyl)ethyl]aniline | Violet |
| 65 | 3-methyl-N:N-di[γ-(β'-hydroxyethoxycarbonyl)propyl]aniline | Red |
| 66 | 3-methyl-N:N-di[(β'-hydroxyethoxycarbonyl)methyl]aniline | Reddish-orange |
| 67 | 3-methyl-N:N-di[δ-(β'-hydroxyethoxycarbonyl)butyl]aniline | Red |
| 68 | 3-methyl-N:N-di[β-(β'-hydroxyethoxycarbonyl)propyl]aniline | " |
| 69 | 2-ethoxy-N:N-di[β-(β'-hydroxyethoxycarbonyl)ethyl]aniline | Bluish-red |
| 70 | 2-methoxy-5-chloro-N:N-di[β-(β'-hydroxyethoxycarbohyl)ethyl]aniline | Red |
| 71 | 2-methoxy-5-bromo-N:N-di[β-(β'-hydroxyethoxycarbonyl)ethyl]aniline | " |
| 72 | 2-methoxy-5-methyl-N:N-di[β-(β'-hydroxyethoxycarbonyl)ethyl]aniline | Reddish-violet |
| 73 | 3-chloro-N:N-di[β-(β'-hydroxyethoxycarbonyl)ethyl]amiline | Scarlet |
| 74 | 3-bromo-N:N-di[β-(β'-hydroxyethoxycarbonyl)ethyl]aniline | " |
| 75 | 3-acetylamino-N:N-di[β-(β'-hydroxyethoxycarbonyl)ethyl]aniline | Reddish-blue |
| 76 | 3-acetylamino-N:N-di[β-(β'-hydroxyethoxycarbonyl)propyl]aniline | " |
| 77 | 3-propionylamino-N:N-di[β-(β'-hydroxyethoxycarbonyl)ethyl]aniline | " |
| 78 | 3-ethylsulphonylamino-N:N-di[β-(β'-hydroxyethoxycarbonyl)ethyl]aniline | " |
| 79 | 3-acetylamino-N:N-di[β-(β'-hydroxyethoxycarbonyl)ethyl] aniline | Bluish-red |
| 80 | 3-acetylamino-N:N-di[β-(γ'-hydroxypropoxycarbonyl)ethyl]aniline | " |
| 81 | 3-acetylamino-N:N-di[β-(δ'-hydroxybutoxycarbonyl)ethyl]aniline | " |
| 82 | 3-acetylamino-N:N-di[β-(β'-hydroxypropoxycarbonyl)ethyl]aniline | " |
| 83 | 3-acetylamino-N:N-di[β-(α'-methyl-β'-hydroxypropoxycarbonyl)ethyl]aniline | " |
| 84 | N:N-di[β-(β'-hydroxyethoxycarbonyl)ethyl]aniline | Scarlet |
| 85 | 3-acetylamino-N:N-di(β-n-propoxycarbonylethyl)aniline | Bluish-red |
| 86 | 3-acetylamino-N:N-di(β-isopropoxycarbonylethyl)aniline | " |
| 87 | 3-acetylamino-N:N-di(β-n-butoxycarbonylethyl)aniline | " |
| 88 | 3-acetylamino-N:N-di(β-sec-butoxycarbonyl)ethyl)aniline | " |
| 89 | 3-acetylamino-N:N-di(β-isobutoxycarbonyl)ethyl)aniline | " |
| 90 | 3-acetylamino-N:N-di(methoxycarbonylethyl)aniline | Scarlet |
| 91 | 3-acetylamino-N:N-di(δ-methoxycarbonylbutyl)aniline | Rubine |
| 92 | 2-methyl-5-methoxy-N:N-di(β-methoxycarbonylethyl)aniline | Red |

Further dyestuffs of the invention are obtained when the 2.54 parts of 2-(N:N-dimethylcarbamoyl)-4:6-dinitroaniline used in Example 1 are replaced by equivalent amounts of the amines listed in Table II. The shades obtained from the resulting dyestuffs are also listed in the Table.

TABLE II

| | Amine | Shade |
|---|---|---|
| A | 2-carbamoyl-4:6-dinitroaniline | Blue |
| B | 2-carbamoyl-4-nitroaniline | Reddish-violet |
| C | 2-(N-methylcarbamoyl)4:6-dinitroaniline | Reddish-blue |
| D | 2-(N-ethylcarbamoyl)-4:6-dinitroaniline | " |

Further dyestuffs of the invention are obtained by diazotising the amines listed in the first column of Table III and coupling with each of the coupling components listed in the second column of the Table, the reference numbers for the coupling components referring back to Table I. The dyestuffs were obtained using methods similar to that described in Example 1. The shades of the dyestuffs ranged from yellow to blue.

TABLE III

| Amine | Coupling Component |
|---|---|
| 2-(N:N-dimethylcarbamoyl)-4:6-dinitroaniline | 6,43 |
| 2-carbamoyl-4-nitroaniline | 43 |
| 2-(N-methylcarbamoyl)-4-nitroaniline | 43 |
| 2-(N-ethylcarbamoyl)-4-nitroaniline | 43 |
| 2-(N-n-propylcarbamoyl)-4-nitroaniline | 43 |
| 2-(N-isoprropylcarbamoyl)-4-nitroaniline | 43 |
| 2-(N-n-butylcarbamoyl)-4-nitroaniline | 43 |
| 2-(N:N-diethylcarbamoyl)-4-nitroaniline | 43 |
| 2-(N-methyl-N-ethylcarbamoyl)-4-nitroaniline | 43 |
| 2-(N:N-dimethylcarbamoyl)-5-nitroaniline | 43 |
| 2-(N:N-dimethylcarbamoyl)-4-nitro-6-chloroaniline | 43 |
| 2-(N:N-dimethylcarbamoyl)-4-nitro-6-bromo-aniline | 43 |
| 2-(N-methylcarbamoyl)4:6-dinitroaniline | 43 |
| 4-(N:N-dimethylcarbamoyl)aniline | 3 |
| 3-(N-ethylcarbamoyl)aniline | 3 |
| 2-carbamoylaniline | 3 |
| 2-chloro-4-(N:N-dimethylcarbamoyl)aniline | 3 |
| 2-bromo-4-(N:N-dimethylcarbamoyl)aniline | 3 |
| 2:5-dichloro-4-(N:N-dimethylcarbamoyl)aniline | 3 |
| 2-chloro-6-bromo-4-(N:N-dimethylcarbamoyl)aniline | 3 |

Further dyestuffs of the invention are obtained by replacing the 3.25 parts of 2-methoxy-5-acetylamino-N:N-di(β-methoxycarbonylethyl) aniline used in Example 1 by equivalent amounts of the following coupling components. In all cases the dyestuffs yielded reddish blus shades.

2-methoxy-5-propionylamino-N:N-di(β-methoxycarbonylethyl)aniline, 2-ethoxy-5-propionylamino-N:N-di(β-methoxycarbonylethyl)aniline,
2-methoxy-5-n-propylcarbonylamino-N:N-di(β-methoxycarbonylethyl)aniline,
2-methoxy-5-methoxycarbonylamino-N:N-di(β-methoxycarbonylethyl)aniline,
2-methoxy-5-ureido-N:N-di(β-methoxycarbonylethyl)aniline,
2-methoxy-5-N-ethylureido-N:N-di(β-methoxycarbonylethyl)aniline,
2-ethoxy-5-methoxycarbonylamino-N:N-di(β-methoxycarbonylethyl)aniline,
2-ethoxy-5-ureido-N:N-di(β-methoxycarbonylethyl)aniline,
2-ethoxy-5-ureido-N:N-di(β-ethoxycarbonylethyl)aniline,
2-methoxy-5-methoxycarbonylamino-N:N-di(β-ethoxycarbonylethyl)aniline,
2-ethoxy-5-acetylamino-N:N-di[β-(β'-hydroxyethoxycarbonyl)ethyl]aniline,
2-methoxy-5-acetylamino-N:N-di[β-(β'-hydroxyethoxycarbonyl)ethyl]aniline, The amines used in the above Examples were themselves obtained by converting the corresponding nitrobenzene carboxylic acid to the acid chloride, condensing with the appropriate amine of the formula: $NHT^1T^2$, and finally reducing the nitro group to an amino group, or by converting the corresponding acetylamino benzenecarboxylic acid to the acid chloride, condensing with an amine of the formula: $HNT^1T^2$, and finally hydrolysing off the N-acetyl group.

We claim:

1. A disperse monoazo dyestuff which is of the formula:

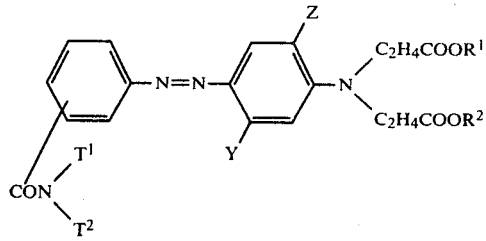

wherein $T^1$ and $T^2$ are independently selected from hydrogen and lower alkyl; Z is selected from hydrogen, lower alkyl and lower alkoxy; Y is selected from hydrogen, chlorine, bromine, lower alkyl, lower alkoxy, —$NHCOX^1$ and —$NHSO_2X^2$, wherein $X^1$ is selected from lower alkyl, lower alkoxy, amino and N-lower alkylamino, and $X^2$ is lower alkyl; and $R^1$ and $R^2$ are each selected from lower alkyl and hydroxyalkyl containing from 2 to 4 carbon atoms.

2. A disperse monoazo dyestuff which is of the formula:

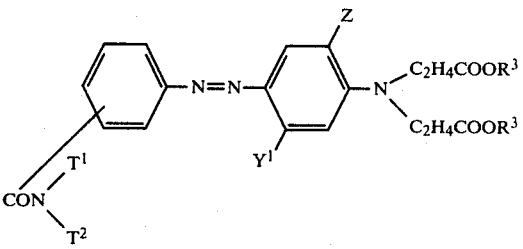

wherein $T^1$ and $T^2$ are each independently selected from hydrogen and lower alkyl; Z is selected from hydrogen, lower alkyl and lower alkoxy; $Y^1$ is selected from hydrogen and lower alkylcarbonylamino; and $R^3$ is lower alkyl.

* * * * *